(12) United States Patent
Chen

(10) Patent No.: US 7,860,121 B2
(45) Date of Patent: Dec. 28, 2010

(54) FORWARDING LOOP PREVENTION APPARATUS AND METHODS

(75) Inventor: Charles Chen, Fremont, CA (US)

(73) Assignee: Cortina Systems, Inc., Sunnyvale, CA (US)

( * ) Notice: Subject to any disclaimer, the term of this patent is extended or adjusted under 35 U.S.C. 154(b) by 413 days.

(21) Appl. No.: 11/980,545

(22) Filed: Oct. 31, 2007

(65) Prior Publication Data

US 2009/0109972 A1   Apr. 30, 2009

(51) Int. Cl.
  *H04J 3/26* (2006.01)
(52) U.S. Cl. .................. 370/432; 370/400; 398/66
(58) Field of Classification Search .................. None
  See application file for complete search history.

(56) References Cited

U.S. PATENT DOCUMENTS

| | | | |
|---|---|---|---|
| 6,023,467 A | 2/2000 | Abdelhamid et al. | |
| 7,272,137 B2 | 9/2007 | Unitt et al. | |
| 7,551,573 B2 * | 6/2009 | Baird et al. | 370/260 |
| 7,684,403 B2 * | 3/2010 | Kim et al. | 370/392 |
| 2004/0240466 A1 * | 12/2004 | Unitt et al. | 370/461 |
| 2005/0074239 A1 * | 4/2005 | Pohjola et al. | 398/70 |
| 2006/0221972 A1 * | 10/2006 | Bhargava et al. | 370/392 |
| 2006/0222012 A1 * | 10/2006 | Bhargava et al. | 370/473 |
| 2006/0268751 A1 * | 11/2006 | Baird et al. | 370/260 |
| 2007/0047959 A1 * | 3/2007 | Thomas et al. | 398/72 |
| 2008/0198857 A1 * | 8/2008 | Kim et al. | 370/401 |

OTHER PUBLICATIONS

"G-PON Common Technical Specification," Feb. 8, 2006.
ITU-T G.984.3, "Gigabit-capable Passive Optical Networks (G-PON): Transmission convergence layer specification," Feb. 2004.
IEEE Std 802.3, "Part 3: Carrier Sense Multiple Access with Collision Detection (CSMA/CD) Access Method and Physical Layer Specifications," Section 65.1, pp. 299-303; Dec. 9, 2005.
IEEE Std 802.1D, "Media Access Control (MAC) Bridges," Section 7, pp. 29-56; Jun. 9, 2004.
International Search Report for PCT/US2008/012308.
Written Opinion for PCT/US2008/012308.

* cited by examiner

*Primary Examiner*—Bob A Phunkulh

(57) ABSTRACT

Forwarding loop prevention apparatus and methods are provided. After a communication traffic block such as a packet is received, a determination is made as to whether the packet is to be broadcasted to a number of communication devices. If the packet is to be broadcasted, the packet is modified to include an indication that the packet is reflected, and the packet is broadcasted. A device that receives the broadcasted packet determines whether it is reflected and whether the identifier is associated with the device. If the packet is reflected and the identifier is associated with the device, the device discards the packet. Otherwise it forwards the packet. Forwarding loops may instead be avoided without modifying packets, based on an amount of time elapsed between sending and receiving a packet.

23 Claims, 12 Drawing Sheets

FORWARDING LOOP PREVENTION APPARATUS AND METHODS

FIELD OF THE INVENTION

The present invention relates generally to the field of communications, and in particular to the prevention of forwarding loops in communication systems.

BACKGROUND

In the communication of data and/or other types of communication traffic, various technologies have been used. For over a hundred years, copper connections between a Central Office (CO) and customers have been sufficient. The evolution of Digital Subscriber Line (DSL) technology, which boosts the data performance of the copper-based last mile, has allowed operators to use their legacy networks to offer high-speed Internet access of speeds between 8 Mbps and 16 Mbps. This bandwidth will likely not be enough to support emerging Internet applications, particularly in markets where demand for High-Definition TV (HDTV) and interactive applications increases. If customers demand more bandwidth than what an all-copper-based last mile can deliver, other network architectures will need to be considered.

In some architectures, there are situations in which a sending device or system receives traffic that it originally sent, which can potentially cause problems.

SUMMARY OF THE INVENTION

An object of some embodiments of the present invention is to provide improved communication apparatus and methods.

Another object of some embodiments of the present invention is to prevent forwarding loops in communication systems.

According to one aspect of the invention, there is provided a method comprising: receiving a block of communication traffic comprising a destination address and an identifier of a sending communication device which sent the block of communication traffic; determining, based on the destination address, whether the block of communication traffic is to be broadcasted to a plurality of communication devices including the sending communication device; and where it is determined that the block of communication traffic is to be broadcasted: including in the block of communication traffic to be broadcasted an indication that the block of communication traffic is a reflected block of communication traffic; and broadcasting the block of communication traffic.

In some embodiments, the including comprises setting an information field, in the block of communication traffic to be broadcasted, to a value indicating that the block of communication traffic is a reflected block of communication traffic, and the method further comprises: setting an information field in a block of communication traffic to be broadcasted to a plurality of different communication devices not including the sending communication device, to a different value.

In some embodiments, the determining comprises at least one of: determining whether the destination address is unknown and determining whether the block of communication information is a multicast or a broadcast block of communication traffic.

In some embodiments, the block of communication traffic is received over a Passive Optical Network (PON), and the broadcasting comprises broadcasting over the PON.

In some embodiments, the PON is a Gigabit-capable PON (GPON).

In some embodiments, the block of communication traffic comprises a port identifier, and the information field comprises a portion of the port identifier.

In some embodiments, the block of communication traffic is a block of communication traffic encapsulating a Local Area Network (LAN) frame or an Ethernet frame containing the destination address.

In some embodiments, the method further comprises: receiving the broadcasted block of communication traffic at a communication device of the plurality of communication devices; determining, based on the information field in the received broadcasted block of communication traffic, whether the received broadcasted block of communication traffic is a reflected block of communication traffic and whether the identifier is associated with the receiving communication device; where it is determined that the received broadcasted block of communication traffic is a reflected block of communication traffic and that the identifier is associated with the receiving communication device, discarding the received broadcasted block of communication traffic; and where it is determined that the received broadcasted block of communication traffic is not a reflected block of communication traffic or that the identifier is not associated with the receiving communication device, forwarding the received broadcasted block of communication traffic.

According to another aspect of the present invention, there is provided an apparatus comprising: an interface that enables the apparatus to receive and send blocks of communication traffic, a received block of communication traffic comprising a destination address and an identifier of a sending communication device which sent the block of communication traffic; a processing module, operatively coupled to the interface, that: determines, based on the destination address, whether a received block of communication traffic is to be broadcasted to a plurality of communication devices including the sending communication device; and where it is determined that the received block of communication traffic is to be broadcasted: includes in the block of communication traffic to be broadcasted an indication that the block of communication traffic is a reflected block of communication traffic; and broadcasts the block of communication traffic through the interface.

In some embodiments, the processing module includes the indication by setting an information field, in the block of communication traffic to be broadcasted through the interface, to a value indicating that the block of communication traffic is a reflected block of communication traffic, and the processing module further sets an information field in a block of communication traffic to be broadcasted through another interface, to a different value.

In some embodiments, the apparatus further comprises: a memory, operatively coupled to the processing module, storing a learning database that learns destination addresses from received blocks of communication traffic, wherein the processing module determines whether the destination address is unknown by determining whether the destination address of the block of communication traffic to be broadcasted matches any of the destination addresses learned by the learning database.

In some embodiments, the processing module determines that the destination address is unknown where an entry in the learning database that matches the destination address is older than a maximum age.

In some embodiments, the interface enables the apparatus to receive and send blocks of communication traffic over a Gigabit-capable Passive Optical Network (GPON), and the apparatus comprises an Optical Line Termination (OLT) system.

In some embodiments, the block of communication traffic comprises a port identifier, and the information field comprises a portion of the port identifier.

In some embodiments, the apparatus is implemented in a communication network, the communication network further comprising a communication device that comprises: an interface that enables the communication device to receive the broadcasted block of communication traffic; a filtering module, operatively coupled to the interface, that: determines, based on the information field, whether the received broadcasted block of communication traffic is a reflected block of communication traffic and whether the identifier is associated with the communication device; discards the received broadcasted block of communication traffic where it is determined that the received broadcasted block of communication traffic is a reflected block of communication traffic and that the identifier is associated with the communication device; and forwards the received broadcasted block of communication traffic where it is determined that the received broadcasted block of communication traffic is not a reflected block of communication traffic or that the identifier is not associated with the communication device.

According to still another aspect of the present invention, there is provided a method comprising: receiving a block of communication traffic at a communication device, the block of communication traffic comprising an identifier of a sending communication device which sent the block of communication traffic and an information field indicative of whether the block of communication traffic is a reflected block of communication traffic; determining, based on the information field, whether the received block of communication traffic is a reflected block of communication traffic and whether the identifier is associated with the receiving communication device; discarding the received block of communication traffic where it is determined that the received block of communication traffic is a reflected block of communication traffic and that the identifier is associated with the receiving communication device; and forwarding the received block of communication traffic where it is determined that the block of communication traffic is not a reflected block of communication traffic or that the identifier is not associated with the receiving communication device.

In some embodiments, receiving comprises receiving the block of communication traffic over a Gigabit-capable Passive Optical Network (GPON), the received block of communication traffic further comprises a port identifier, and the information field comprises a portion of the port identifier.

According to yet another aspect of the present invention, there is provided a communication device comprising: an interface that enables the communication device to receive blocks of communication traffic, a block of communication traffic comprising an identifier of a sending communication device which sent the block of communication traffic and an information field indicative of whether the block of communication traffic is a reflected block of communication traffic; a filtering module, operatively coupled to the interface, that: determines, based on the information field, whether the received block of communication traffic is a reflected block of communication traffic and whether the identifier is associated with the communication device; discards the received block of communication traffic where it is determined that the received block of communication traffic is a reflected block of communication traffic and that the identifier is associated with the communication device; and forwards the received block of communication traffic where it is determined that the received block of communication traffic is not a reflected block of communication traffic or that the identifier is not associated with the communication device.

In some embodiments, the communication device further comprises: a further interface operatively coupled to the filtering module, wherein the filtering module forwards the received block of communication traffic through the further interface.

In some embodiments, the device comprises an Optical Network Terminal (ONT).

According to a further aspect of the present invention, there is provided a method comprising: receiving a block of communication traffic comprising a source address; determining, based on the source address, whether the received block of communication traffic corresponds to a previously sent block of communication traffic; where it is determined that the received block of communication traffic corresponds to the previously sent block of communication traffic, determining whether a threshold period of time has elapsed since the previously sent block of communication traffic was sent; and discarding the received block of communication traffic where it is determined that the threshold period of time has not elapsed.

In some embodiments, the method further comprises, prior to receiving the block of communication traffic: receiving the previously sent block of communication traffic; and sending the previously sent block of communication traffic, wherein determining whether the threshold period of time has elapsed comprises determining an amount of time elapsed since the sending.

In some embodiments, the method further comprises, prior to receiving the block of communication traffic: determining whether the source address of the previously sent block of communication traffic is unknown; and where it is determined that the source address of the previously sent block of communication traffic is unknown, storing the source address of the previously sent block of communication traffic to a learning database.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE INVENTION

Figure 1:
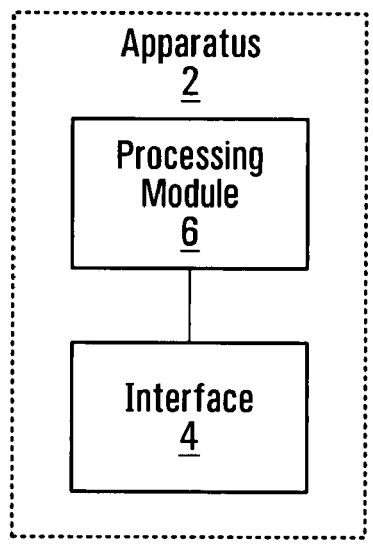
FIG. 1 is a block diagram of an apparatus according to an aspect of the present invention.

FIG. 1 is a block diagram of an apparatus according to an aspect of the present invention. It should be appreciated that the Figures are intended solely for the purposes of illustration. The present invention is in no way limited to the specific embodiments shown in the drawings and explicitly described herein. Variations of those embodiments may be or become apparent to those skilled in the art.

The apparatus 2 has an interface 4 coupled to a processing module 6. The interface 4 may be implemented in many ways. For example, the interface 4 may be a Passive Optical Network (PON) interface for use in a PON or Gigabit-capable PON (GPON). The processing module 6 might be implemented in software for execution by a processing element, hardware, firmware, or some combination thereof. One or more components such as a microprocessor, an Application Specific Integrated Circuit (ASIC), a Programmable Logic Device (PLD), and/or a Field Programmable Gate Array (FPGA), for instance, might be suitable for implementing the functions of the processing module 6 described herein.

The interface 4 enables the apparatus 2 to receive and send blocks of communication traffic. A traffic block includes a destination address and an identifier of a sending communication device which sent the block.

The block of communication traffic may be any type of block of communication traffic that is used to transport any kind of information. For example, the block may encapsulate a frame containing the destination address. The frame can be a Local Area Network (LAN) frame, such as an Ethernet frame. The frame relates to Peer-to-Peer (P2P) communications in some embodiments.

The processing module 6 determines, based on the destination address, whether the block is to be broadcasted to a group of communication devices that includes the sending device.

Where the processing module 6 determines that the block is to be broadcasted to the sending device, the processing module 6 includes in the block an indication that the block is a reflected block of communication traffic. In some embodiments, this involves setting an information field in the block to a value indicating that the block is a reflected block, and setting an information field in a block of communication traffic to be broadcasted to a different group of communication devices, such as through another interface (not shown) for instance, to a different value.

Thus, a block of communication traffic may be broadcasted or otherwise forwarded in different forms, with or without an indication that the block is reflected. The processing module 6 broadcasts the block(s) of communication traffic through the interface 4.

Figure 2:
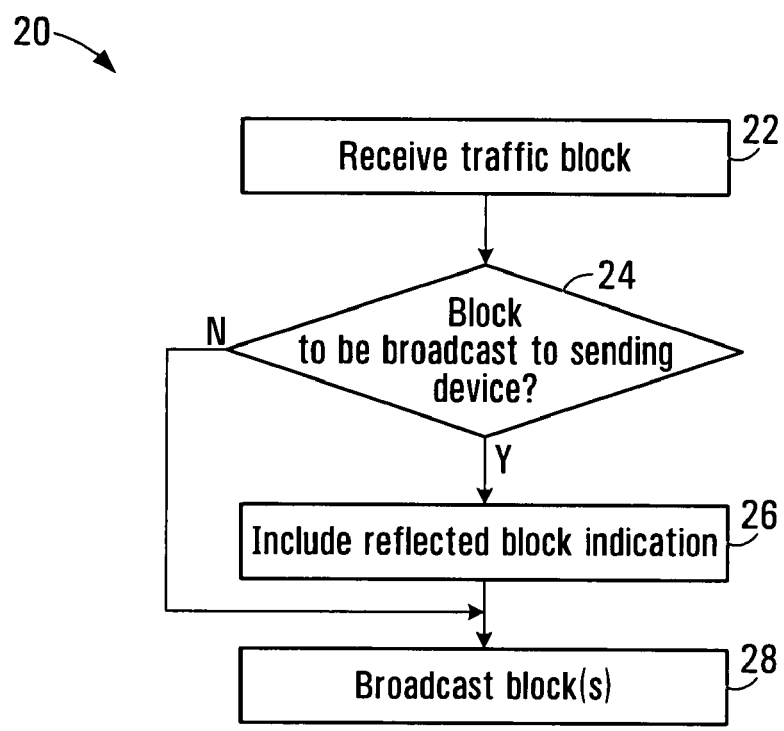
FIG. 2 is a flowchart of a method according to another aspect.

FIG. 2 is a flowchart of a method according to another aspect of the invention. Shown is a method 20, which involves, at 22, receiving a block of communication traffic. The block includes a destination address and an identifier of a sending device which sent the block.

At 24, a determination is made, based on the destination address, as to whether the block is to be broadcasted to a number of devices including the sending device. For example, this determination may involve determining whether the destination address is unknown, or determining whether the block of communication information is a multicast or a broadcast block of communication traffic.

Where it is determined that the block is to be broadcasted to the sending device (yes path, step 24), at 26 an indication that the block is a reflected block is included in the block. Where it is determined that the block is not to be broadcasted to the sending device (no path, step 24), at 28 the block is broadcasted through the interface.

It should be noted that the method 20 is illustrative of one embodiment of the invention. Other embodiments may include fewer, further, or different steps. For example, the determination at 24 might not result in only one block for broadcast or forwarding at 28. As noted above, different traffic blocks may be broadcasted or forwarded to different groups of communication devices, and not all of those broadcasted or forwarded traffic blocks would include the reflected block indication. Therefore, more than one traffic block may be broadcasted or forwarded at 28.

Other variations may also be or become apparent to those skilled in the art.

Figure 3:
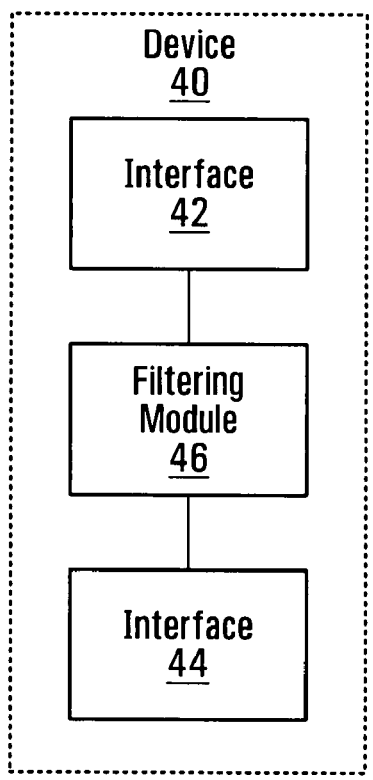
FIG. 3 is a block diagram of a communication device according to another aspect.

FIG. 3 is a block diagram of a communication device according to another aspect of the invention. The device 40 has an interface 42 and another interface 44 coupled to a filtering module 46.

The interfaces 42, 44 may be any of a number of types of communication interfaces. In one embodiment, interface 42 is a PON interface, and interface 44 is some other type of interface that enables communication traffic to be exchanged with a user communication device. One example is a User Network Interface (UNI). Although in many implementations the interfaces 42, 44 will be of different types, the present invention is not in any way restricted to such implementations. The interfaces 42, 44 may be of the same or different types. Also, it is possible that the same interface may be used to receive and forward communication traffic as described herein, and that a communication device may include more than two interfaces.

The filtering module 46 represents an element that is capable of filtering blocks of communication traffic and might be, for example, a switch configured for filtering. It can be implemented in software, hardware, firmware, or any combination thereof.

In operation, the interface 42 receives blocks of communication traffic. A traffic block has an identifier of a sending device which sent the block and an information field indicative of whether the block is a reflected block of communication traffic. The received block is a block generated as described above.

The filtering module 46 determines, based on the information field, whether the block of communication traffic is a reflected block and whether the identifier in that block is associated with the device 40. In other words, the filtering module 46 determines whether or not the device 40 previously sent the traffic block it is now receiving. The filtering module 46 might determine whether the identifier in the received traffic block corresponds to the interface 42, for example.

Where the filtering module 46 determines that the block of communication traffic is a reflected block and that the identifier is associated with the device 40, the filtering module 46 discards the received traffic block. Otherwise, specifically if the filtering module 46 determines that the received traffic block is not a reflected block and/or that the identifier is not associated with the device 40, the filtering module 46 forwards the block through the interface 44.

Figure 4:
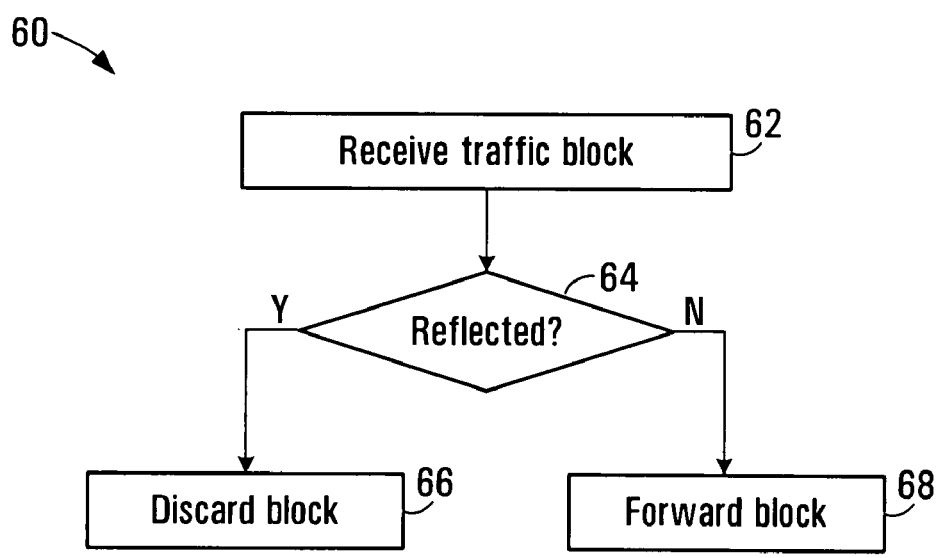
FIG. 4 is a flowchart of a method according to another aspect.

FIG. 4 is a flowchart of a method according to another aspect of the invention. According to method 60, at 62 a block of communication traffic is received. The block includes an identifier of a sending device which sent the block and an information field indicative of whether the block is a reflected block of communication traffic.

At 64, a determination is made, based on the information field, as to whether the block is a reflected block and whether the identifier is associated with the receiving device.

Where it is determined that the block is a reflected block and that the identifier is associated with the receiving device (yes path, step 64), at 66 the received traffic block is discarded. However, if it is determined that the block is not a reflected block or that the identifier is not associated with the receiving device (no path, step 64), at 68 the received traffic block is forwarded. The receiving at 62 and the forwarding at 68 may involve different interfaces of a communication device in some embodiments.

Other filtering rules may be used. In some embodiments, based on the determination at 64 as to whether the received block is a reflected block and whether the identifier is associated with the receiving device, the received traffic block is discarded if it is a reflected block and the identifier is associated with the device, or if the traffic block is not a reflected block and the identifier is not associated with the device. Otherwise, specifically if the traffic block is a reflected block and the identifier is not associated with the device, or if the traffic block is not a reflected block and the identifier is associated with the device, then the traffic block is forwarded.

Figure 5:
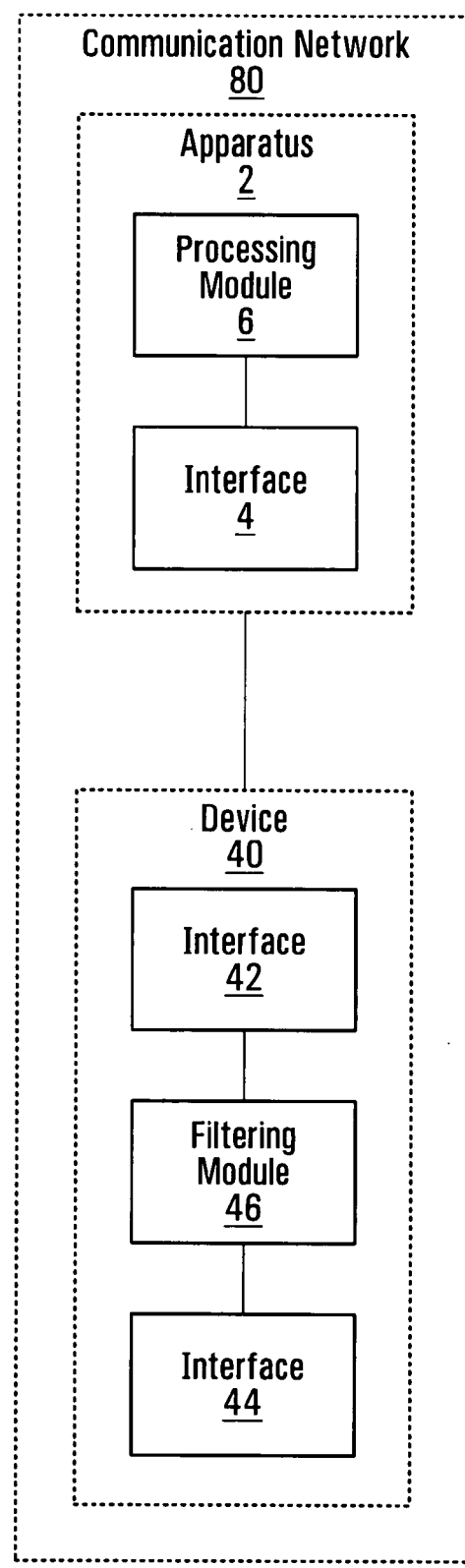
FIG. 5 is a block diagram of the apparatus and device of FIGS. 2 and 4 in one embodiment.

The apparatus 2 (FIG. 1) may be implemented in a communication network that also includes one or more of the devices 40 (FIG. 3), as shown in FIG. 5. In this case, the apparatus 2 can indicate in blocks reflected back to the device 40 that those blocks are reflected blocks, thereby enabling the device to detect reflected packets and avoid forwarding loops.

Embodiments of the present invention may be implemented in any of various networks. For example, a block of communication traffic may be received and broadcasted over a network having a point-to-multipoint (P2MP) architecture, or a PON, such as a GPON. PONs and GPONs are described in more detail below as illustrative examples of communication systems in conjunction with which embodiments of the present invention could be implemented.

As noted above, historically copper-based networks have been used. One candidate to replace copper in the so-called "last mile" is optical fiber. In certain network configurations, optical fiber can deliver to a customer downstream and upstream speeds having a much higher bandwidth, for example more than 100 Mbps. Among possible optical access technologies, a PON provides an option for operators to deliver very high-speed broadband access in a cost-effective way.

A PON is a passive technology because passive splitters are used. A PON uses Time Division Multiple Access (TDMA). More specifically, in downstream the traffic is broadcast across a P2MP Optical Distribution Network (ODN) from an Optical Line Termination (OLT) system at a Central Office (CO) side to all Optical Network Units or Optical Network Terminals (ONTs) on a single wavelength at a Customer Premise Equipment (CPE) side, where the ONTs filter traffic based on ONT identifiers carried in frames.

Figure 6:
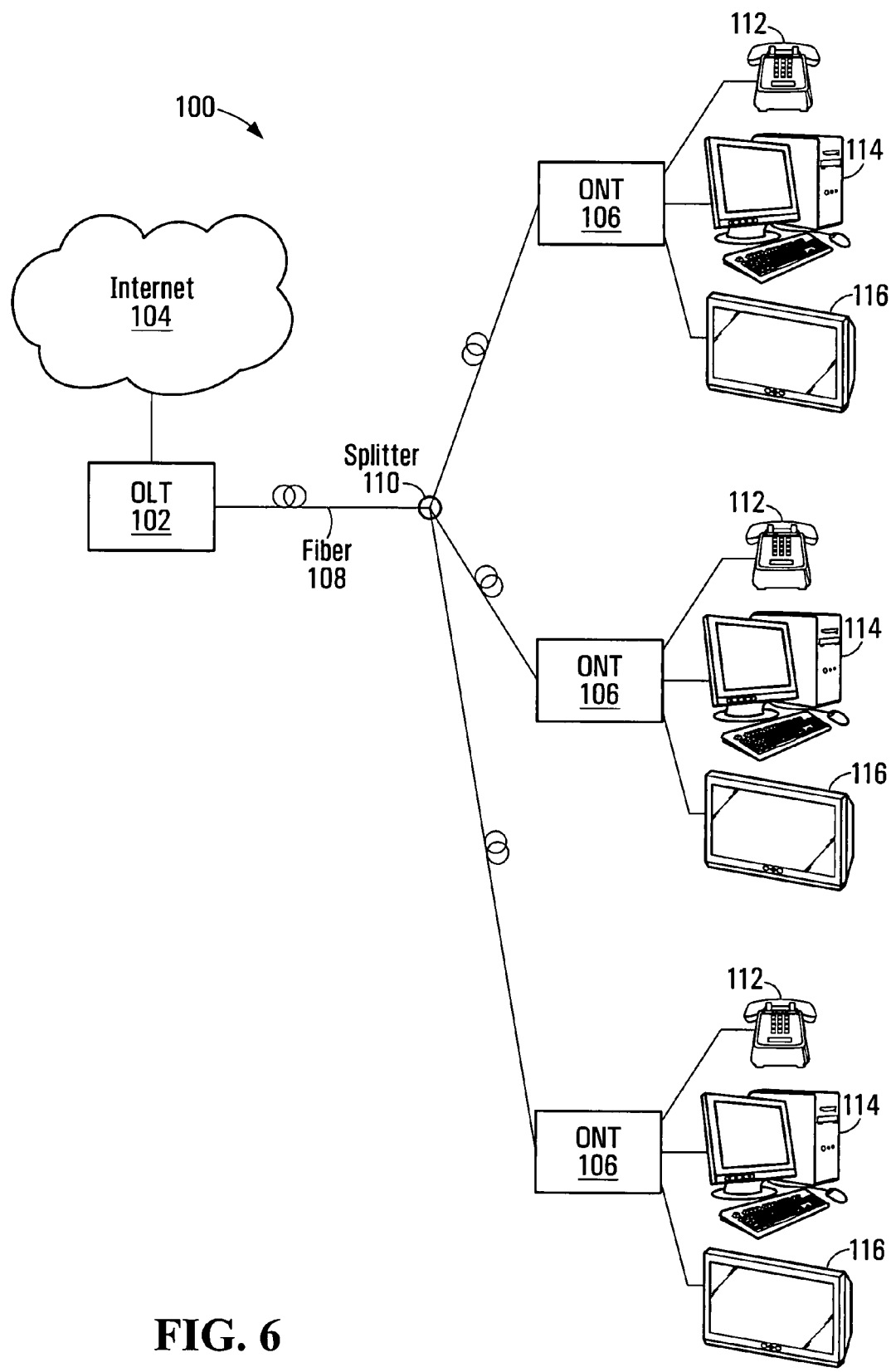
FIG. 6 is a block diagram of an example Passive Optical Network (PON)

FIG. 6 is a block diagram of an example PON 100. Shown is an OLT 102 connected to a network, such as the Internet 104. The OLT 102 is also coupled with ONTs 106 over optical fiber 108 and a splitter/combiner 110. Those skilled in the art will be familiar with examples of these network elements.

Regarding upstream traffic, the OLT 102 is the master and also controls the upstream channel through assignment of upstream transmission windows to each ONT 106. This means that the upstream channel includes bursts of traffic, one after the other, from different ONTs 106. The information indicating which ONT 106 is allowed to transmit is carried in-band on the downstream channel. Each ONT 106 can be connected to one or more multimedia devices such as telephones 112, computers 114 and/or television sets 116.

Due to the directional properties of optical splitters/combiners 110, the OLT 102 is able to broadcast data to all ONTs 106 in the downstream direction. This is an important property of passive optical networks, referred to as single-channel broadcast (SCB). This property is particularly attractive to emerging applications such as Television over Internet Protocols (IPTV), where one television broadcast channel can be delivered to multiple subscribers.

In the upstream direction, however, ONTs 106 cannot communicate directly with one another. Instead, each ONT 106 is able to send data only to the OLT 102. Thus, in the downstream direction a PON may be viewed as a point-to-multipoint network; while in the upstream direction, a PON may be viewed as a multipoint-to-point network. It is noteworthy that the upstream bandwidth is time shared by all ONTs 106, and only one ONT 106 can transmit data to the OLT 102 at a time to avoid traffic collision. The OLT 102 arbitrates which ONT 106 can transmit traffic at a time and the duration of such transmission. This operation is known as Dynamic Bandwidth Allocation (DBA).

GPON has been successfully standardized at ITU-T following work done by a Full Service Access Network (FSAN) group: ITU-T G.984.x, Study Group 15, "Gigabit-capable Passive Optical Networks (GPON)", http://www.itu.int; and FSAN, http://www.fsanweb.org. GPON is a powerful and flexible optical access system with various options to accommodate many services and interface types.

GPON is designed to support various application protocols such as Time Division Multiplexing (TDM), Asynchronous Transfer Mode (ATM) and Ethernet. The GPON Transmission Convergence (GTC) specification, referenced above, defines the framing format for both directions. GPON does not transport Ethernet frames natively, but rather encapsulates them using GPON Encapsulation Method (GEM) to enable fragmentation. As a result, variable length packets are extracted from fixed length GTC frames and complete Ethernet frames are reconstructed. This is performed by GEM.

Embodiments of the present invention may be implemented to transport Ethernet over GPON using GEM. This can be useful, for example, in enabling the communication of peer (ONT) to peer (ONT) via the same OLT.

Figure 7:
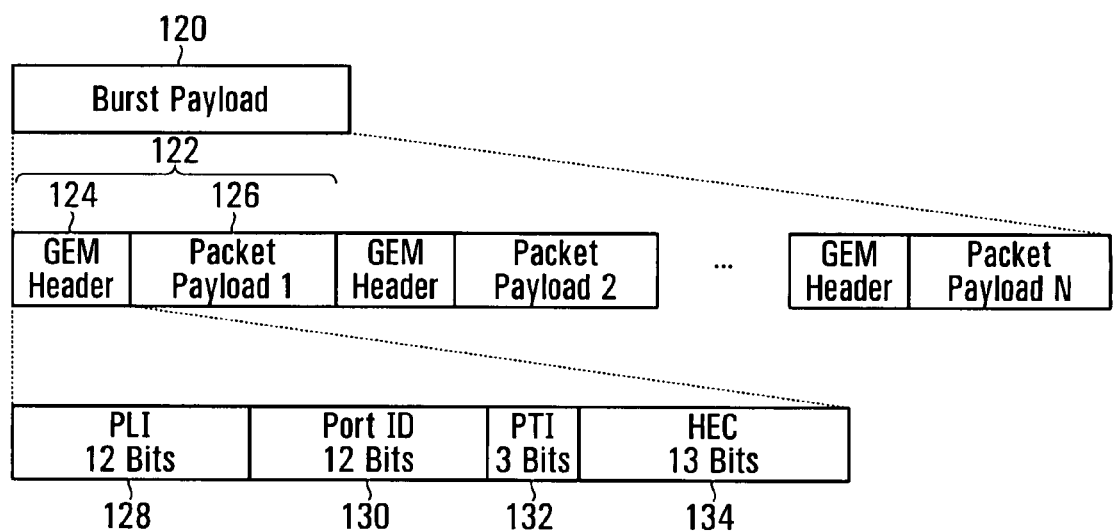
FIG. 7 is a representation of a frame structure according to a Gigabit-capable PON (GPON) Encapsulation Method (GEM)

FIG. 7 is a representation of a frame structure according to GEM. As shown, each burst payload 120 of a GTC frame includes a variable number of GEM packets 122. Each GEM packet includes a 5-byte long header 124 followed by a payload area 126 of variable length. The GEM header 124 contains: a Payload Length Indicator (PLI) 128 used for delineation; a Port-ID 130 that allows multiplexing of traffic flows; a Payload Type Indicator (PTI) 132, which indicates not only if the fragment contains user data or Operation, Administration and Maintenance (OAM) data, but also whether it is the last fragment of a user frame; and a Header Error Control (HEC) field 134 for not only error detection and correction but also delineation.

Traffic flows between the OLT 102 and ONT(s) 106 in GEM mode are identified by their Port-IDs 130. The 12-bit Port-ID field 130 is carried in each GEM packet. The downstream packet stream is then filtered at the ONT 106 based upon the 12-bit Port-ID field 130 contained in each GEM packet 122. ONTs 106 are configured to recognize which Port-IDs 130 belong to them, and packets that do belong to the ONTs 106 are passed on to a GEM client process. In the upstream, the 12-bit Port-ID field 130 contained in each GEM packet 122 is used to inform the OLT 102 which ONT 106 the received packet came from, so that the OLT 102 will process and forward the packet accordingly.

There are two types of Port-ID 130, namely unicast and broadcast/multicast. A unicast Port-ID is bidirectional and configured to be a single traffic flow between the OLT 102 and a particular ONT 106. A broadcast and multicast Port-ID is unidirectional in downstream and configured to a traffic flow from the OLT 102 to a set of ONTs 106. In the following, Port-ID is generally referred to be unicast, unless stated otherwise.

With world-wide proliferation of Ethernet technology, Ethernet has become the dominating traffic type supported over GPON. One great benefit of using Ethernet in GPON is that most upper layer protocols and applications are based on Ethernet and could continue functioning without any change. However, GPON operating in its native point-to-multipoint (P2MP) mode disrupts the fundamental operation of Ethernet protocols. The operation of Ethernet protocols is described, for example, in the following documents: IEEE 802.1D-2004 IEEE standard for local and metropolitan area networks—Media access control (MAC) Bridges; and IEEE 802.3-2005 IEEE Standard for Information technology-Telecommunications and information exchange between systems-Local and metropolitan area networks—Specific requirements Part 3: Carrier Sense Multiple Access with Collision Detection (CSMA/CD) Access Method and Physical Layer Specifications.

Routers, bridges and hosts typically only know about point-to-point or shared LANs, and do not know about point-to-multipoint LANs. For example, when a router receives an Internet Protocol (IP) multicast packet from an Ethernet interface, it assumes that all of the stations on that interface have also received the packet, and that it does not have to reflect that packet back to the same interface.

Figure 8:
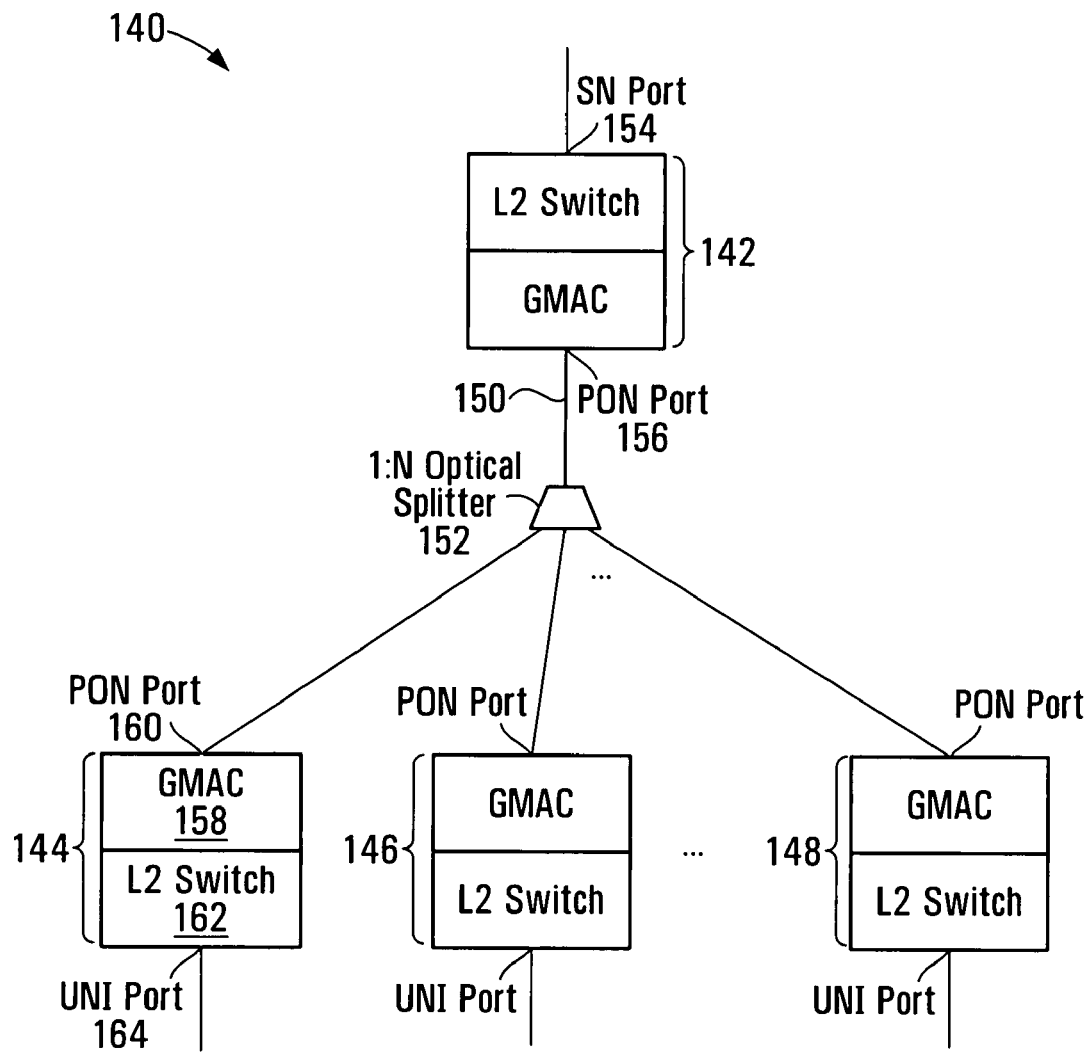
FIG. 8 is a block diagram of an implementation of a Gigabit-capable PON (GPON) and a Layer 2 (L2) Ethernet switch.

The Port-ID allows the underlying P2MP GPON network to appear as a collection of point-to-point links to higher protocol layers. FIG. 8 is a block diagram of an implementation of a GPON and a Layer 2 Ethernet switch. Shown is a PON 140 which includes OLT 142 coupled to ONTs 144, 146 and 148 over optical fiber 150 and splitter/combiner 152. OLT 142 includes an SN port 154 and a PON port 156. ONT 144 includes a GPON Media Access Control (GMAC) unit 158 with a PON port 160, and a Layer 2 switch 162 with a UNI port 164. The ONTs 146, 148 have the same structure. Those skilled in the art will be familiar with examples of these elements.

As shown, the Layer 2 switch function is integrated with the GPON MAC at both OLT and an ONT. On the operation of upstream, the OLT can learn the association of Source Address (SA) and Port-ID carried in packets received from an ONT. An address may be a MAC address. Typically, on the operation of downstream, the OLT will perform a table lookup for the packet it has received, using the Destination Address (DA) carried in the packet. This lookup results in an associated Port-ID for the corresponding address if it has been learned in the upstream operation. For unknown unicast or multicast or broadcast address, a broadcast Port-ID will be selected to send the packet to all connected ONTs. An unknown unicast packet is a unicast packet which does not have a match in a forwarding database containing learned and/or configured entries. In a shared LAN environment, multicast or broadcast packets should be flooded to other stations within the network.

The above switching and forwarding operations work correctly if downstream packets are received from a Service Network (SN) port and forwarded onto a PON port. A major problem occurs when one ONT is attempting to communicate with another ONT via the OLT, which is a peer to peer (P2P) communication. At the very beginning, the OLT has not learned any MAC addresses from any ONT, so the initial packet received will be flooded back to the PON port in a broadcast fashion, as described previously for unknown unicast, multicast, or broadcast traffic. In this case, the ONT sending the first packet will not be able to distinguish whether the reflected broadcast downstream packet was originally sent from itself or not. This results in a forwarding loop, because the same packet has now been forwarded to the source direction from which it originally came. This problem prevents the fundamental loop-free operation of Ethernet switching and forwarding.

An example of a forwarding loop is described with reference to FIG. 8. Consider an illustrative example in which the ONT 144 receives an (Address Request protocol) ARP packet on its UNI port 164. The ARP packet is typically the first packet sent in P2P communication at the IP level via a shared LAN environment. The ARP packet carries a broadcast destination address and a source address of the original station attached behind the ONT 144. The ONT 144 attaches an appropriate Port-ID to the packet and forwards it to the OLT 142. In one scenario, the ARP packet attempts to establish P2P communication to another station behind the ONT 146. Since it is a broadcast packet, the OLT 142 in turn sends this packet to all its other ports including the PON port 156. The packet sent to the PON port 156 will be attached to a special broadcast Port-ID so that all connected ONTs can receive it, including the ONT 144. Without any additional mechanism, the ONT 144 would not be able to distinguish whether it sent the packet upstream or not. In the event that ONT 144 received its own packet, a loop has been formed and the ONT 144 will continue forwarding the packet to the source station behind it. A troublesome scenario arises when there is another switch between the ONT 144 and the source station, and this switch alternatively learns the SA on different physical ports, which causes failure of the forwarding path.

A forwarding loop in an Ethernet domain is broadly defined as the same packet having been forwarded through a Layer 2 device more than once. The forwarding loop is harmful in such a network, which can cause a failure affecting the entire network.

In some embodiments, the methods of FIGS. 2 and 4 are implemented to prevent a forwarding loop using a tagging technique. These methods would allow an ONT to identify a downstream packet which it originally sent to an OLT. Furthermore, the ONT would be configured to filter its own packets reflected back to it from the OLT.

Figure 9:
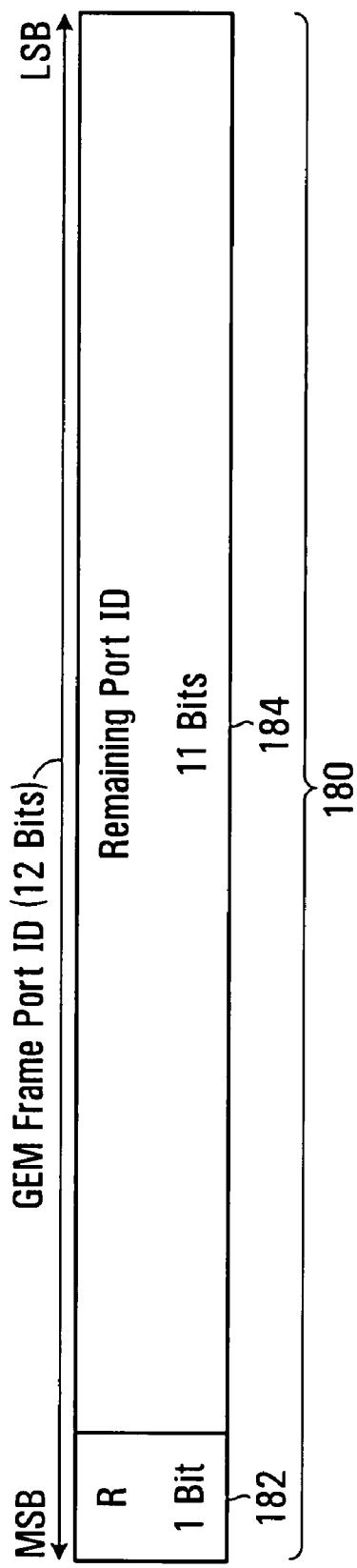
FIG. 9 is a representation of an example of a GEM Port-ID in one embodiment.

A packet including a port identifier is thus one example of a traffic block described above. The information field in a broadcasted traffic block may therefore include a portion of the port identifier. FIG. 9 is a representation of an example of a GEM Port-ID 180 in one embodiment. A Reflection Bit 182, or R bit, is provided in the Port-ID field 180. Although the most significant bit is used in this example, a bit or any number of bits in any position within the Port-ID field 180 may be used.

The R bit 182 might be set to one in the downstream direction to allow an ONT to detect and filter out its own packets. In upstream direction, the value of the R bit 182 might be set to zero. In this specific example, the effective Port-ID field 180 has been reduced to the remaining Port-ID 184, namely from 12 bits (covering values from 0 to 4095) to 11 bits (covering values from 0 to 2047). In this specific example, when the OLT has to reflect a received packet from a PON port back to that PON port, it will set the R bit 182 to one. In all other cases, this bit remains zero in downstream. An R bit of value one in this example thus also provides an indication that the traffic block is a broadcast block. A special broadcast Port-ID is not used, since the remainder of the Port-ID field includes the sending Port-ID.

Any of a number of other arrangements are also possible.

Figure 10:
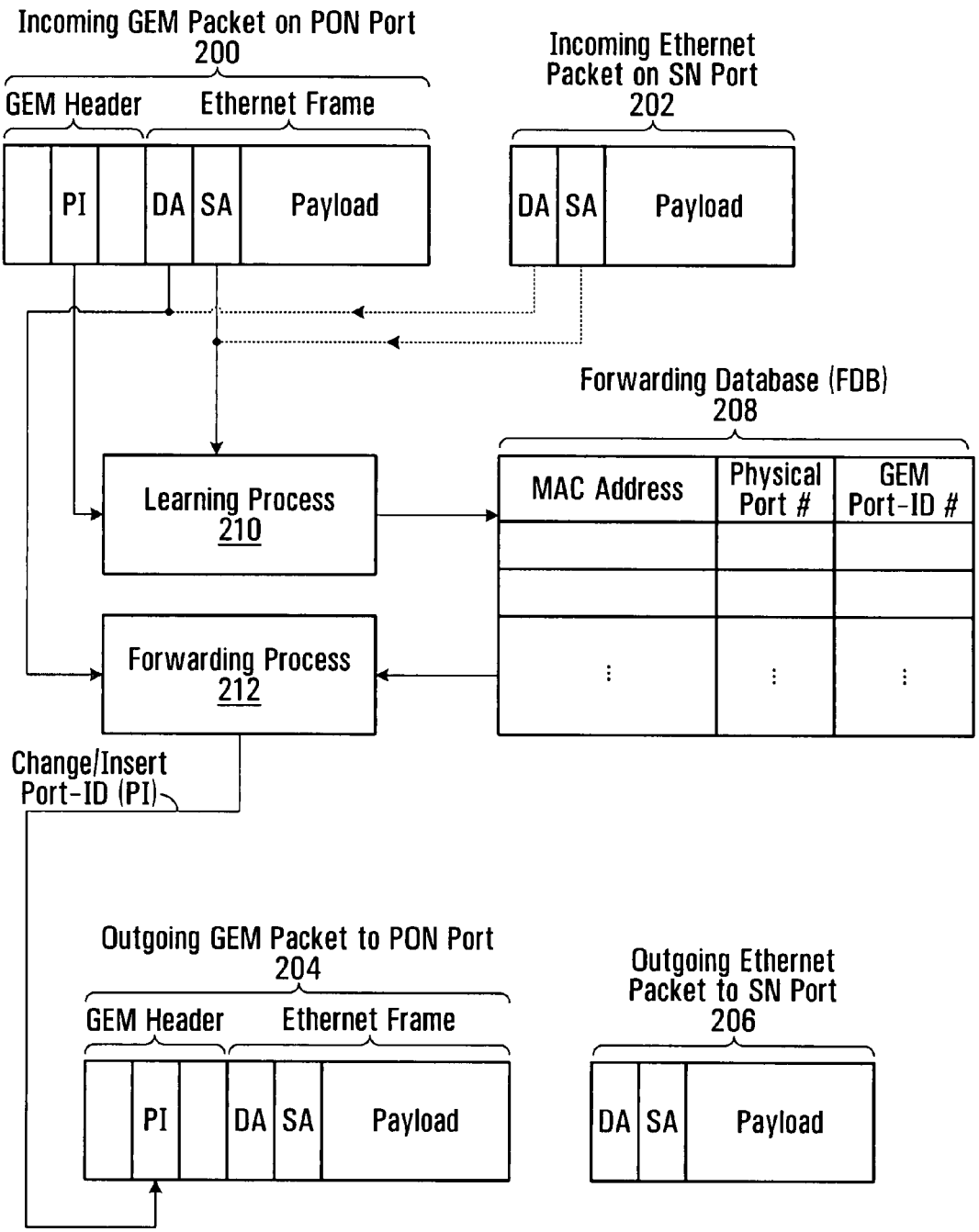
FIG. 10 is a block diagram of example processing according to the apparatus or method of FIG. 1 or 2.

FIG. 10 is a block diagram of example processing according to the apparatus or method of FIG. 1 or 2. Shown is the processing flow at the OLT, where an incoming packet arrives from a PON port or an SN port as incoming packet 200 or 202, respectively. The incoming packet 200, 202 goes through the packet processing procedure, including a learning process 210 and a forwarding process 212, and eventually departs at an outgoing port, either a PON port or an SN port, as an outgoing packet 204 or 206, respectively.

In some embodiments, the database 208 is a learning database connected to a processing module, such as the processing module 6 in FIG. 1. This database 208 learns destination addresses of blocks of communication traffic, and in this case determining whether a destination address is unknown, as described above, might involve determining whether the destination address of a received packet matches any of the destination addresses learned by the learning database. Accordingly, the forwarding database (FDB) 208 is updated by a learning process 210, and used by a forwarding process 212 for a lookup operation.

Each entry in the FDB 208 table contains the association of MAC address, physical port, and GEM Port-ID whenever relevant. However, other types of addresses may be used. For example, in a Virtual LAN (VLAN) learning case, both VLAN ID and MAC address may be used instead of MAC addresses alone. For each received packet, the learning process 210 first determines whether the SA contained in the packet already exists in the FDB 208. If the SA does not exist, a new entry will be created for the new SA along with the physical port on which the packet arrives, and the GEM Port-ID information if the packet arrives from a PON port. If the physical port is an SN port, the GEM Port-ID field may be left void.

The forwarding process 212 decides how to forward the packet using the information in the FDB 208 and Port-ID processing rules. Using the destination address contained in the packet 200, 202 as an index, the forwarding process 212 performs a lookup in the FDB table 208. If there is a match, then the packet 200, 202 will be forwarded onto the destination physical port, along with the Port-ID if the destination port is a PON port. If there is no match, for example in the case of an unknown unicast, or if the packet 200, 202 is a multicast or broadcast packet, then the packet 200, 202 would be flooded to all other ports. In the VLAN learning case, the packet 200, 202 would be flooded to a particular VLAN domain.

Furthermore, for the packet 202 to be flooded to a PON port on which the packet 202 did not arrive, the forwarding process will set the Port-ID field to be a broadcast Port-ID with R bit set to zero. For the packet 200 to be reflected back to a PON port on which it arrived, the forwarding process 212 will continue using the received Port-ID, but sets the R bit to 1. The receiving Port-ID indicates from which ONT the packet 200 came. The R bit in turn indicates to the receiving ONT that it is a reflected packet. This is described in more detail below.

In some embodiments, an aging process is used. With this process, each entry in the FDB table 208 is associated with an aging timer, which is reset when an update takes place. The timer can be decremented periodically. When the timer expires, the entry associated with the timer will be deleted.

Figure 11:
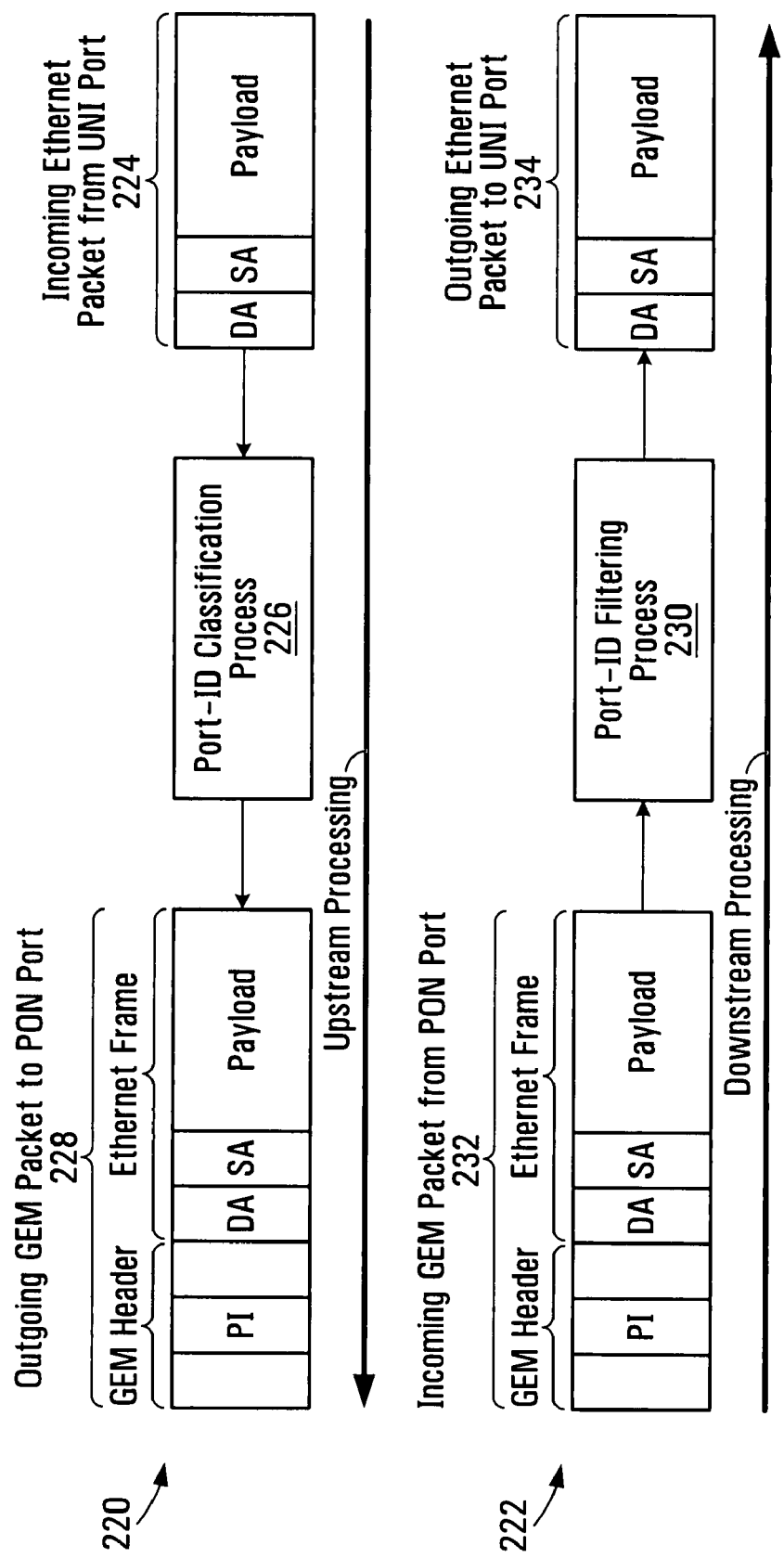
FIG. 11 is a block diagram of example processing according to the device or method of FIG. 3 or 4.

On the ONT side, there are the upstream process 220 and the downstream process 222, respectively, as shown in FIG. 11. Shown is a block diagram of example processing according to the device or method of FIG. 3 or 4.

In the upstream process 220, an appropriate Port-ID is determined for an incoming Ethernet packet 224 arriving from a UNI port. This is typically achieved according to a Port-ID classification process 226, which produces an outgoing packet 228 to a PON port. As noted above, one or more Port-IDs can be assigned to an ONT. In some embodiments, the R bit in a Port-ID in the upstream direction is always set to zero.

In the downstream process 222, a Port-ID filtering process 230 determines whether a received packet 232 should be forwarded as packet 234 or discarded. This serves to filter those packets that are not intended for this ONT and to identify those packets that are reflected back from the OLT.

If the R bit in the received packet 232 is 1 and the Port-ID matches one of the ONT's own Port IDs, then the ONT will discard the packet 232. It discards the packet 232, because the packet 232 is its own packet reflected from the OLT, as a result of the OLT forwarding process.

Figure 12:
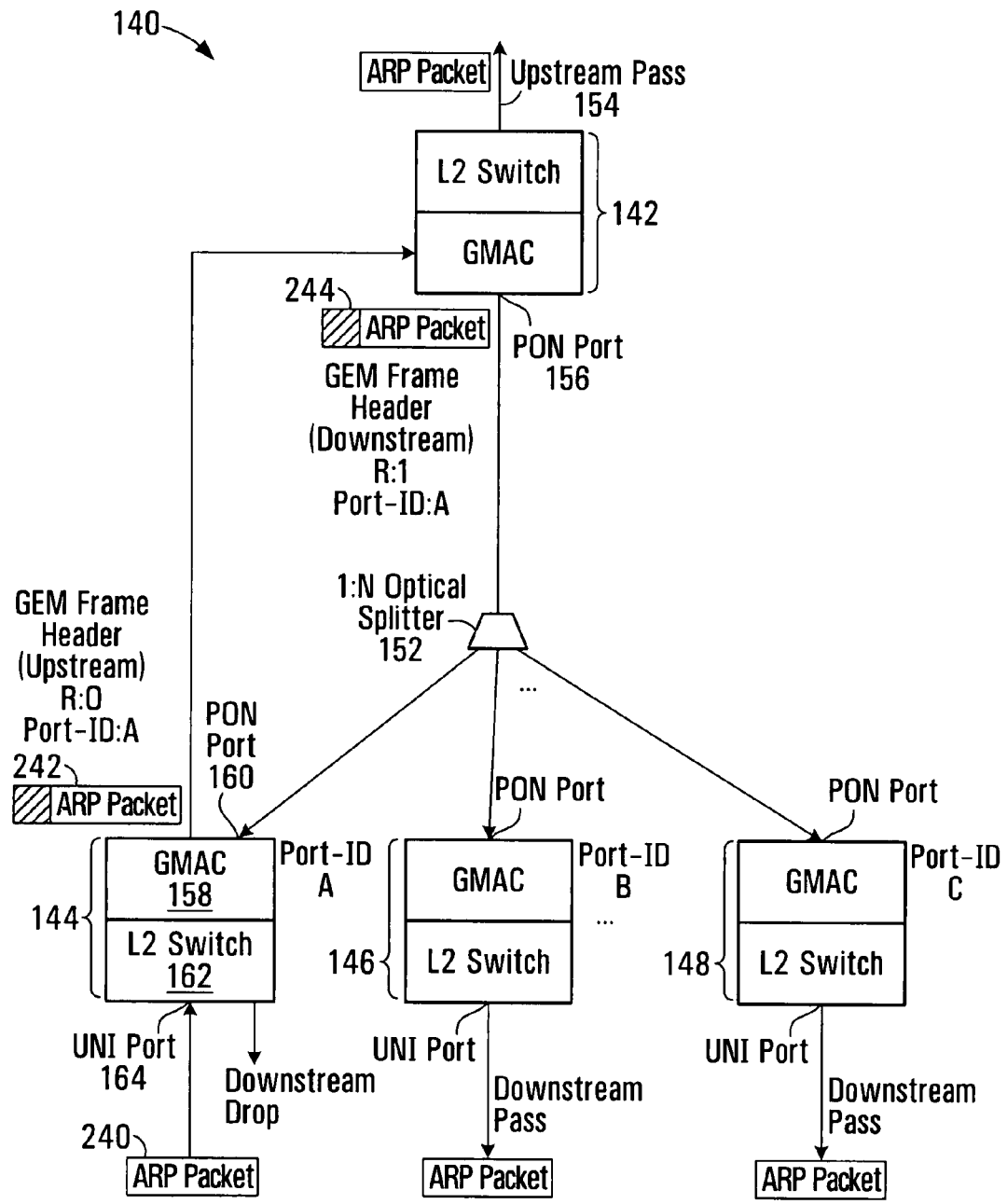
FIG. 12 is a block diagram of example Address Request Protocol (ARP) packet processing in the network of FIG. 8 according to one embodiment.

An example is shown in FIG. 12 to demonstrate the tagging technique using the R bit to prevent a forwarding loop in a peer to peer communication scenario. FIG. 12 is a block diagram of example ARP packet processing in the network of FIG. 8 according to one embodiment.

In this example, the ONT 144 receives an ARP packet 240 on its UNI port 164, which is a broadcast Ethernet frame. Then it attaches one of its own Port-IDs, for example "A", to this packet with the R bit set to zero, before forwarding it upstream to the OLT 142 as ARP packet 242.

During the forwarding process, the OLT 142 determines if the packet 242 is a broadcast packet and floods the packet to all physical ports that are coupled to the PON port 156, on which the packet arrived. For the replicated packet 244 that is reflected back to the PON port 156, the OLT will set the R bit to 1 while keeping the Port-ID value of A, before delivering the packet 244 downstream to all ONTs.

Based on the R bit filtering and the Port-ID of "A", only the ONT 144 discards the packet, while other ONTs 146, 148 continue forwarding it. As a result, the forwarding loop can be prevented.

Figure 13:
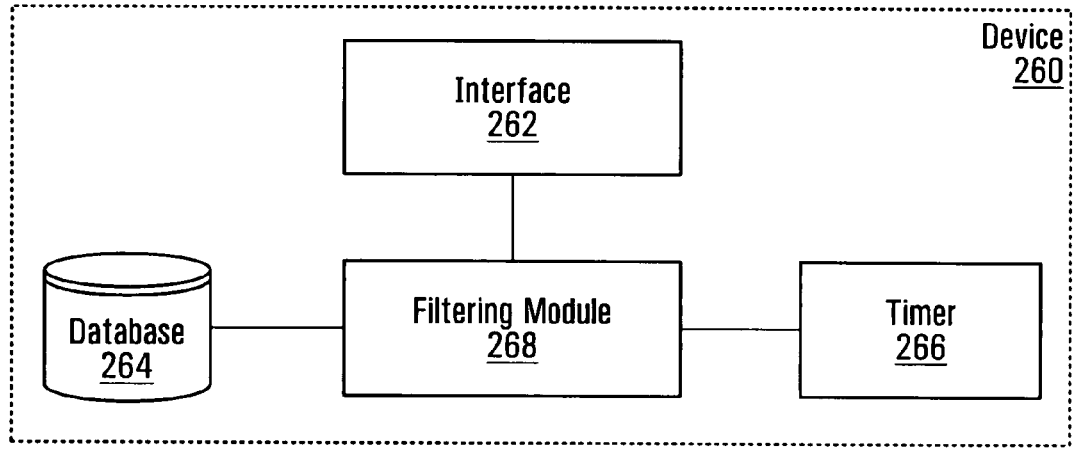
FIG. 13 is a block diagram of a communication device according to another aspect.

FIG. 13 is a block diagram of a communication device according to another aspect of the present invention. The device 260 includes an interface 262, a database 264, and a timer 266 coupled to a filtering module 268. A number of implementations are possible. For example, the device 260 can be an ONT, the interface 262 a PON interface, and the filtering module 268 a filtering process. The filtering module 268 and/or timer 266 can be implemented in hardware, software, firmware, or a combination thereof, and in an Ethernet switch for instance.

The interface 262 enables the device 260 to receive blocks of communication traffic. Each received traffic block includes a source address. The filtering module 268 determines, based on the source address and the database 264, whether the received block of communication traffic corresponds to a previously sent block of communication traffic.

In some embodiments, the database 264 is a learning database that learns the source addresses of blocks of communication traffic, as noted above. Accordingly, determining whether the received block of communication traffic corresponds to a previously sent block of communication traffic might involve determining whether the source address of the received block of communication traffic matches any of the source addresses learned by the database 264.

Where the filtering module 268 determines that the received block of communication traffic corresponds to a previously sent block of communication traffic, the filtering module 268 further determines, based on an elapsed time tracked by the timer 266, whether a threshold period of time has elapsed since the previously sent block of communication traffic was sent. Thus, prior to receiving the traffic block, the timer 266 may have been started when the block was previously sent.

If it is determined by the filtering module 268 that the threshold period of time has not elapsed since the block of communication traffic was previously sent, the filtering module 268 discards the received block of communication traffic. However, where the filtering module 268 determines that the threshold period of time has elapsed since the previously sent block of communication traffic was sent, the filtering module 268 forwards the received block of communication traffic. This allows the filtering module 268 to detect traffic blocks that were sent a short time ago and discard those blocks as likely reflected blocks.

The timer 266 allows the filtering module 268 to distinguish between the case where the traffic block is reflected and the case where the device 260 has moved. This is explained in more detail as follows. As noted above, in some embodiments determining whether a traffic block was previously sent is based on learning the source address using the database 264. When a traffic block is received by the device 260 from a user station through a UNI port, for example, and forwarded through the interface 262, the database 264 may learn the source address of the traffic block by associating the source address with the UNI port through which it received the traffic block. Later, if the traffic block including the address that was previously learned during a forwarding process on the interface 262 is received again at a different interface, then it is likely that the traffic block is being reflected back. Using the timer 266 addresses the situation where the originating station has moved.

It would normally take several seconds or more to move a station between ports, whereas traffic block reflection is usually on the order of milliseconds, for example 100 milliseconds. Using an amount of time that it normally takes to reflect a packet as a threshold period of time, the filtering module 268 can determine, based on elapsed time tracked by the timer 266, whether the threshold period of time has elapsed since the previously sent traffic block was sent and, if not, discard the block.

Accordingly, it may be possible for the device to prevent a forwarding loop, by detecting whether or not a block of traffic has been reflected. In this embodiment, there is no modification to an information field such as a Port-ID.

Figure 14:
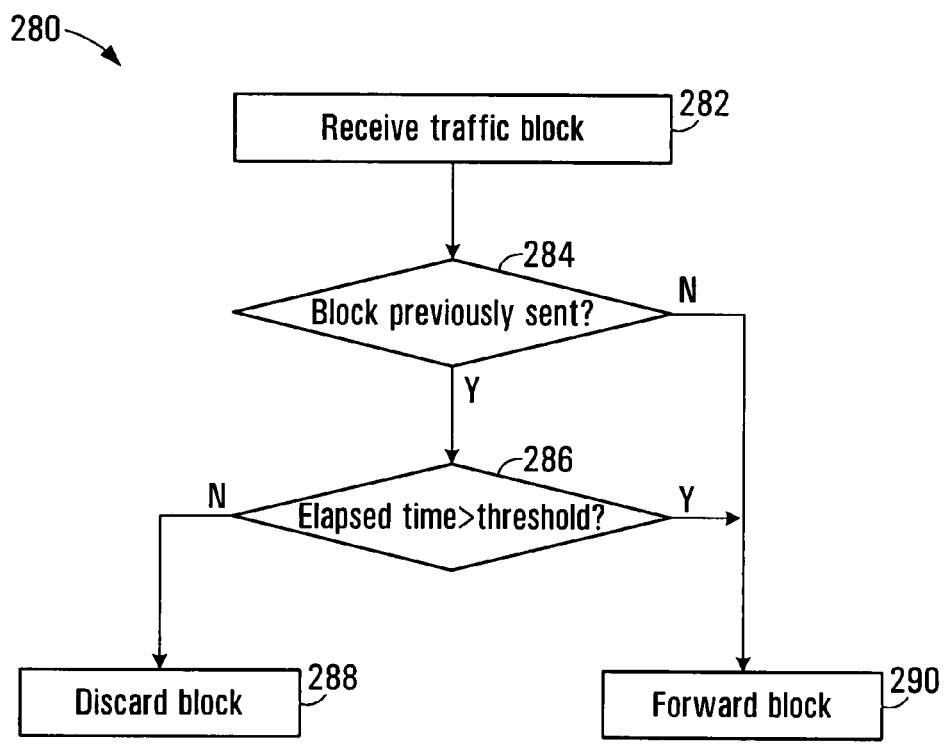
FIG. 14 is a flowchart of a method according to another aspect.

FIG. 14 is a flowchart of a method according to another aspect of the invention. According to method 280, at 282 a block of communication traffic, which includes a source address, is received. At 284, a determination is made, based on the source address, as to whether the received block corresponds to a previously sent block. If so, such as where a traffic block was sent from the same source address (yes path, step 284), at 286 a determination is made as to whether a threshold period of time has elapsed since the previously sent block was sent.

Where less than the threshold period of time has elapsed since the previous block was sent (no path, step 286), at 288 the received block is discarded. Otherwise, the threshold period of time has elapsed (yes path, step 286), and at 290 the received block is forwarded.

Figure 15:
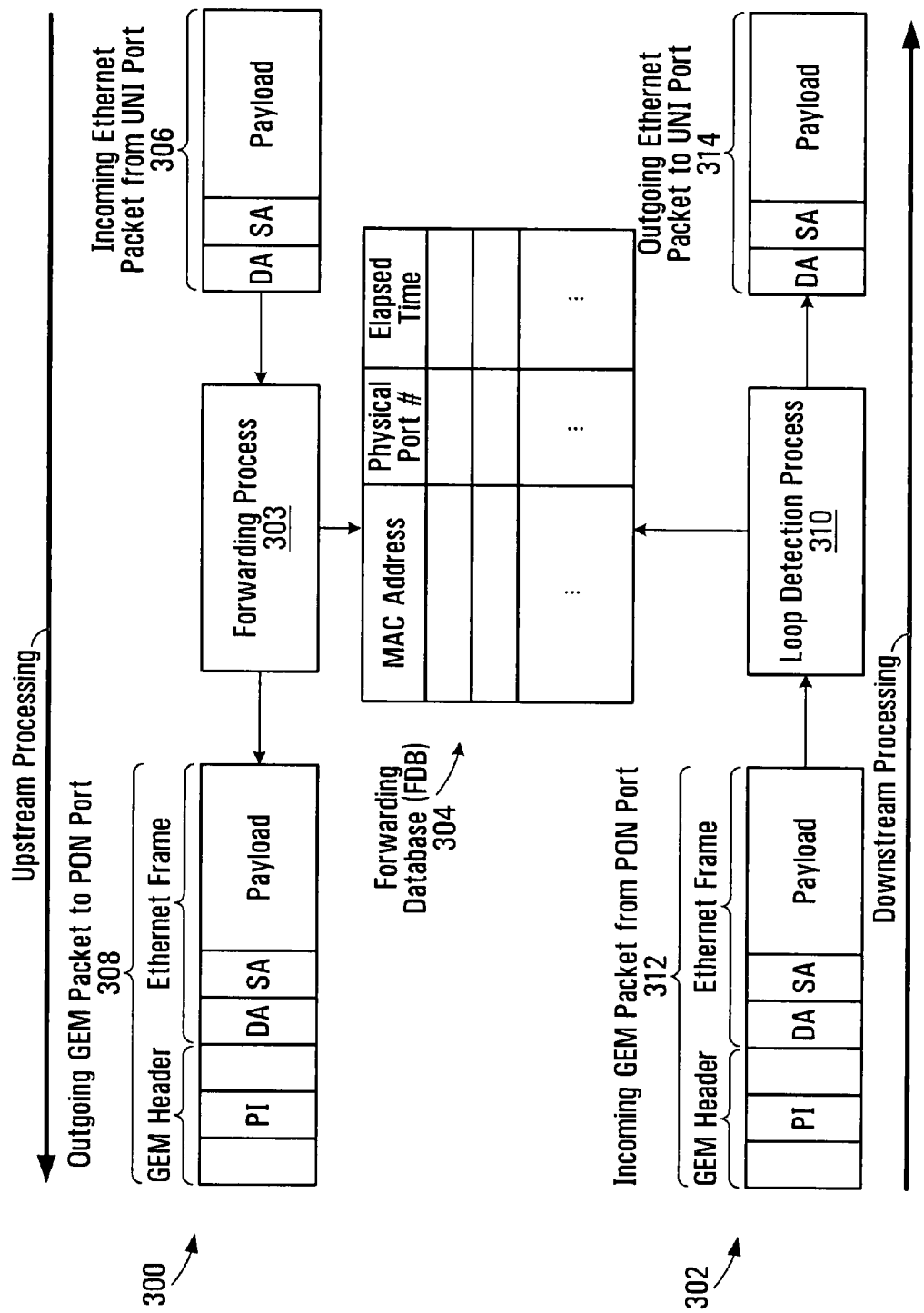
FIG. 15 is a block diagram of example processing according to the device or method of FIG. 13 or 14.

In one specific embodiment, this technique is implemented in a GPON. The OLT uses a broadcast Port-ID for those unknown unicast, multicast, or broadcast packets in downstream, including those that need to be reflected back. FIG. 15 is a block diagram of example processing according to the device or method of FIG. 13 or 14. FIG. 15 shows a forwarding database (FDB) 304 that is updated by the upstream processing 300 and used by the downstream processing 302 for lookup operation, respectively.

In the FDB 304, each entry contains MAC address, physical port and elapsed time (ET) information. In the upstream process 300, the FDB 304 is updated during the forwarding process 303, using the SA address contained in the received packet 306. If an entry already exists in the FDB 304 for the SA, then the physical port and ET information will be updated. If an entry does not already exist for the SA, then a new entry with the physical port and ET information will be created. The physical port indicates the port on which the packet arrives. In this example, it is an UNI port. In some embodiments, the ET field is always set to a pre-defined value each time an update takes place. The ET is decremented automatically as time passes by. This can be implemented using a standard aging process in an Ethernet switch. Eventually an outgoing packet 308 is outputted.

In the downstream processing 302, a loop detection process 310 first determines whether a received packet 312 is potentially a reflected packet or not, by performing the lookup operation in the FDB 304 using the SA as an index. If there is no match, it is certain that the packet 312 is not reflected back from the OLT. As a result, the packet 312 should be forwarded normally as outgoing packet 314. If there is a match and the physical port points to a UNI port, then it is then likely that this packet 312 is potentially reflected back from the OLT. It is likely reflected back, because the packet's SA has been learned on a UNI port, which further indicates the packet 312 may have been transmitted upstream. At this point, the loop detection process 310 checks the ET value of this field. If the ET value elapses only over a short time in comparison to its original value, then it is likely that the packet is reflected from the OLT. As can be seen, the ET is used for the purpose of safeguarding the case when the original station moves from one place to another.

What has been described is merely illustrative of the application of the principles of the invention. Other arrangements and methods can be implemented by those skilled in the art without departing from the spirit and scope of the present invention.

For example, other embodiments of the invention may include fewer, further, or different method operations or apparatus components than shown. Operations may be performed in a similar or different order, and components may also be interconnected in the same or different ways.

In addition, although described herein primarily in terms of methods and apparatus, embodiments of the invention may be implemented in other forms, as a data structure or instructions stored on a computer-readable medium, for example. This medium might be a memory or storage medium or a signal, for instance.

Instructions could be executed by a computer or other processing element to perform the functions described above. In the case of a data structure, such a structure might include an indication of whether a communication traffic block that is being broadcasted or otherwise forwarded was originally received from a sending communication device, and an identifier of the sending device. This allows the sending device to detect a reflected traffic block. Another data structure might store a sending device identifier and an indication of a time at which a traffic block was sent, to enable reflection of the traffic block to be detected on the basis of time. Both of these techniques have been described in detail above.

I claim:

1. A method comprising:
    receiving a block of communication traffic comprising a destination address and an identifier of a sending communication device which sent the block of communication traffic;
    determining, based on the destination address, whether the block of communication traffic is to be broadcasted to a plurality of communication devices including the sending communication device; and
    where it is determined that the block of communication traffic is to be broadcasted:
        including in the block of communication traffic to be broadcasted an indication that the block of communication traffic is a reflected block of communication traffic; and
        broadcasting the block of communication traffic.

2. The method of claim 1, wherein the including comprises setting an information field, in the block of communication traffic to be broadcasted, to a value indicating that the block of communication traffic is a reflected block of communication traffic, and wherein the method further comprises:
    setting an information field in a block of communication traffic to be broadcasted to a plurality of different communication devices not including the sending communication device, to a different value.

3. The method of claim 1, wherein the determining comprises at least one of: determining whether the destination address is unknown and determining whether the block of communication information is a multicast or a broadcast block of communication traffic.

4. The method of claim 1, wherein the block of communication traffic is received over a Passive Optical Network (PON), and wherein the broadcasting comprises broadcasting over the PON.

5. The method of claim 4, wherein the PON is a Gigabit-capable PON (GPON).

6. The method of claim 5, wherein the block of communication traffic comprises a port identifier, and wherein the information field comprises a portion of the port identifier.

7. The method of claim 1, wherein the block of communication traffic is a block of communication traffic encapsulating a Local Area Network (LAN) frame or an Ethernet frame containing the destination address.

8. The method of claim 1, further comprising:
    receiving the broadcasted block of communication traffic at a communication device of the plurality of communication devices;
    determining, based on the information field in the received broadcasted block of communication traffic, whether the received broadcasted block of communication traffic is a reflected block of communication traffic and whether the identifier is associated with the receiving communication device;
    where it is determined that the received broadcasted block of communication traffic is a reflected block of communication traffic and that the identifier is associated with the receiving communication device, discarding the received broadcasted block of communication traffic; and
    where it is determined that the received broadcasted block of communication traffic is not a reflected block of communication traffic or that the identifier is not associated with the receiving communication device, forwarding the received broadcasted block of communication traffic.

9. An apparatus comprising:
    an interface that enables the apparatus to receive and send blocks of communication traffic, a received block of communication traffic comprising a destination address and an identifier of a sending communication device which sent the block of communication traffic;
    a processing module, operatively coupled to the interface, that:
        determines, based on the destination address, whether a received block of communication traffic is to be broadcasted to a plurality of communication devices including the sending communication device; and
        where it is determined that the received block of communication traffic is to be broadcasted:
            includes in the block of communication traffic to be broadcasted an indication that the block of communication traffic is a reflected block of communication traffic; and
            broadcasts the block of communication traffic through the interface.

10. The apparatus of claim 9, wherein the processing module includes the indication by setting an information field, in the block of communication traffic to be broadcasted through the interface, to a value indicating that the block of communication traffic is a reflected block of communication traffic, and wherein the processing module further sets an information field in a block of communication traffic to be broadcasted through another interface, to a different value.

11. The apparatus of claim 9, further comprising:
    a memory, operatively coupled to the processing module, storing a learning database that learns destination addresses from received blocks of communication traffic,
    wherein the processing module determines whether the destination address is unknown by determining whether the destination address of the block of communication traffic to be broadcasted matches any of the destination addresses learned by the learning database.

12. The apparatus of claim 11, wherein the processing module determines that the destination address is unknown where an entry in the learning database that matches the destination address is older than a maximum age.

13. The apparatus of claim 9, wherein the interface enables the apparatus to receive and send blocks of communication traffic over a Gigabit-capable Passive Optical Network (GPON), and wherein the apparatus comprises an Optical Line Termination (OLT) system.

14. The apparatus of claim 13, wherein the block of communication traffic comprises a port identifier, and wherein the information field comprises a portion of the port identifier.

15. The apparatus of claim 9, implemented in a communication network, the communication network further comprising a communication device that comprises:
- an interface that enables the communication device to receive the broadcasted block of communication traffic;
- a filtering module, operatively coupled to the interface, that:
  - determines, based on the information field, whether the received broadcasted block of communication traffic is a reflected block of communication traffic and whether the identifier is associated with the communication device;
  - discards the received broadcasted block of communication traffic where it is determined that the received broadcasted block of communication traffic is a reflected block of communication traffic and that the identifier is associated with the communication device; and
  - forwards the received broadcasted block of communication traffic where it is determined that the received broadcasted block of communication traffic is not a reflected block of communication traffic or that the identifier is not associated with the communication device.

16. A method comprising:
- receiving a block of communication traffic at a communication device, the block of communication traffic comprising an identifier of a sending communication device which sent the block of communication traffic and an information field indicative of whether the block of communication traffic is a reflected block of communication traffic;
- determining, based on the information field, whether the received block of communication traffic is a reflected block of communication traffic and whether the identifier is associated with the receiving communication device;
- discarding the received block of communication traffic where it is determined that the received block of communication traffic is a reflected block of communication traffic and that the identifier is associated with the receiving communication device; and
- forwarding the received block of communication traffic where it is determined that the block of communication traffic is not a reflected block of communication traffic or that the identifier is not associated with the receiving communication device.

17. The method of claim 16, wherein receiving comprises receiving the block of communication traffic over a Gigabit-capable Passive Optical Network (GPON), wherein the received block of communication traffic further comprises a port identifier, and wherein the information field comprises a portion of the port identifier.

18. A communication device comprising:
- an interface that enables the communication device to receive blocks of communication traffic, a block of communication traffic comprising an identifier of a sending communication device which sent the block of communication traffic and an information field indicative of whether the block of communication traffic is a reflected block of communication traffic;
- a filtering module, operatively coupled to the interface, that:
  - determines, based on the information field, whether the received block of communication traffic is a reflected block of communication traffic and whether the identifier is associated with the communication device;
  - discards the received block of communication traffic where it is determined that the received block of communication traffic is a reflected block of communication traffic and that the identifier is associated with the communication device; and
  - forwards the received block of communication traffic where it is determined that the received block of communication traffic is not a reflected block of communication traffic or that the identifier is not associated with the communication device.

19. The communication device of claim 18, further comprising:
- a further interface operatively coupled to the filtering module,
- wherein the filtering module forwards the received block of communication traffic through the further interface.

20. The communication device of claim 18, wherein the device comprises an Optical Network Terminal (ONT).

21. A method comprising:
- receiving a block of communication traffic comprising a source address;
- determining, based on the source address, whether the received block of communication traffic corresponds to a previously sent block of communication traffic;
- where it is determined that the received block of communication traffic corresponds to the previously sent block of communication traffic, determining whether a threshold period of time has elapsed since the previously sent block of communication traffic was sent; and
- discarding the received block of communication traffic where it is determined that the threshold period of time has not elapsed.

22. The method of claim 21, further comprising, prior to receiving the block of communication traffic:
- receiving the previously sent block of communication traffic; and
- sending the previously sent block of communication traffic,
- wherein determining whether the threshold period of time has elapsed comprises determining an amount of time elapsed since the sending.

23. The method of claim 22, further comprising, prior to receiving the block of communication traffic:
- determining whether the source address of the previously sent block of communication traffic is unknown; and
- where it is determined that the source address of the previously sent block of communication traffic is unknown, storing the source address of the previously sent block of communication traffic to a learning database.

* * * * *